(12) United States Patent
Shikida et al.

(10) Patent No.: US 11,394,586 B2
(45) Date of Patent: Jul. 19, 2022

(54) WIRELESS APPARATUS AND CHANNEL PREDICTION METHOD

(71) Applicant: NEC CORPORATION, Tokyo (JP)

(72) Inventors: Jun Shikida, Tokyo (JP); Kazushi Muraoka, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 16/975,294

(22) PCT Filed: Mar. 8, 2019

(86) PCT No.: PCT/JP2019/009291
§ 371 (c)(1),
(2) Date: Aug. 24, 2020

(87) PCT Pub. No.: WO2019/172412
PCT Pub. Date: Sep. 12, 2019

(65) Prior Publication Data
US 2021/0344524 A1    Nov. 4, 2021

(30) Foreign Application Priority Data
Mar. 9, 2018  (JP) .............................. JP2018-043389

(51) Int. Cl.
*H04L 27/06*    (2006.01)
*H04L 25/02*    (2006.01)
(Continued)

(52) U.S. Cl.
CPC ...... *H04L 25/0212* (2013.01); *H04L 25/0242* (2013.01); *H04B 7/0413* (2013.01); *H04L 27/2607* (2013.01)

(58) Field of Classification Search
CPC .................. H04L 25/0212; H04L 25/0242
See application file for complete search history.

(56) References Cited

U.S. PATENT DOCUMENTS 7,672,221 B2   3/2010  Fuji et al.
8,009,745 B2   8/2011  Glazko et al.
(Continued)

FOREIGN PATENT DOCUMENTS

JP   2006-352492 A   12/2006
JP   2008-510381 A    4/2008
(Continued)

OTHER PUBLICATIONS

Wong et al., "Long Range Channel Prediction for Adaptive OFDM Systems", Proc. IEEE ACSSC, Nov. 2004, pp. 732-736 (5 pages total).

(Continued)

*Primary Examiner* — Zhiren Qin
(74) *Attorney, Agent, or Firm* — Sughrue Mion, PLLC

(57) ABSTRACT

A wireless apparatus includes a channel estimation part that acquires an estimated impulse response which is an estimate value of an impulse response of a channel between a wireless terminal and the wireless apparatus, a tap location error detection part that detects a tap location error between estimated impulse responses at different time points out of the estimated impulse responses, and a channel prediction part that calculates a predicted impulse response which is an impulse response of the channel at a future time point by using the estimated impulse responses and the tap location error.

20 Claims, 7 Drawing Sheets

(51) Int. Cl.
*H04B 7/0413* (2017.01)
*H04L 27/26* (2006.01)

(56) References Cited

U.S. PATENT DOCUMENTS

| | | |
|---|---|---|
| 8,144,824 B2 | 3/2012 | Vrcelj et al. |
| 8,165,167 B2 | 4/2012 | Vrcelj et al. |
| 8,175,123 B2 | 5/2012 | Vrcelj et al. |
| 8,428,001 B2 | 4/2013 | Vrcelj et al. |
| 8,531,937 B2 | 9/2013 | Levy |
| 8,553,797 B2 | 10/2013 | Okino |
| 8,565,359 B2 | 10/2013 | Valadon et al. |
| 8,861,572 B2 | 10/2014 | Lindoff et al. |
| 8,908,813 B2 | 12/2014 | Xu |
| 8,917,583 B2 | 12/2014 | Levy |
| 9,107,105 B2 | 8/2015 | Zhang |
| 9,258,040 B2 | 2/2016 | Levy |
| 9,288,094 B2 | 3/2016 | Arembepola et al. |
| 9,444,531 B2 | 9/2016 | Levy |
| 9,742,610 B2 | 8/2017 | Arembepola et al. |
| 2001/0004384 A1* | 6/2001 | Takanashi ......... H04L 25/03057 708/301 |
| 2006/0018411 A1* | 1/2006 | Gore .................. H04L 25/0204 375/340 |
| 2006/0034165 A1 | 2/2006 | Levy |
| 2006/0215539 A1 | 9/2006 | Vrcelj et al. |
| 2006/0227812 A1 | 10/2006 | Vrcelj et al. |
| 2006/0233097 A1 | 10/2006 | Vrcelj et al. |
| 2006/0245349 A1 | 11/2006 | Vrcelj et al. |
| 2007/0002728 A1 | 1/2007 | Fujii et al. |
| 2007/0110174 A1* | 5/2007 | Glazko .............. H04L 27/2665 375/260 |
| 2007/0195906 A1* | 8/2007 | Kim .................... H04B 7/0421 375/267 |
| 2009/0110044 A1* | 4/2009 | Wu ...................... H04L 25/022 375/231 |
| 2010/0054380 A1 | 3/2010 | Valadon et al. |
| 2011/0064152 A1 | 3/2011 | Okino |
| 2012/0027048 A1 | 2/2012 | Lindoff et al. |
| 2013/0315336 A1 | 11/2013 | Levy |
| 2014/0056393 A1 | 2/2014 | Xu |
| 2014/0254534 A1 | 9/2014 | Zhang |
| 2015/0030095 A1 | 1/2015 | Levy |
| 2015/0172088 A1 | 6/2015 | Arambepola et al. |
| 2016/0087699 A1 | 3/2016 | Levy |
| 2016/0285664 A1 | 9/2016 | Arembepola et al. |
| 2016/0380712 A1 | 12/2016 | Levy |
| 2018/0241442 A1* | 8/2018 | Zirwas ............... H04L 25/0212 |
| 2018/0262369 A1* | 9/2018 | Ruebsamen ...... H04L 25/03012 |

FOREIGN PATENT DOCUMENTS

| | | |
|---|---|---|
| JP | 2008-533846 A | 8/2008 |
| JP | 2008-533860 A | 8/2008 |
| JP | 2009-516483 A | 4/2009 |
| JP | 2010-273364 A | 12/2010 |
| JP | 2012-516096 A | 7/2012 |
| JP | 5073809 B2 | 11/2012 |
| JP | 5875691 B2 | 3/2016 |

OTHER PUBLICATIONS

International Search Report dated Apr. 16, 2019 in International Application No. PCT/JP2019/009291.

* cited by examiner

4a: ESTIMATED IMPULSE RESPONSE AT TIME POINT $t_{i-1}$

4b: ESTIMATED IMPULSE RESPONSE AT TIME POINT $t_i$

5a: ESTIMATED IMPULSE RESPONSE AT TIME POINT $t_{i-1}$

5b: ESTIMATED IMPULSE RESPONSE AT TIME POINT $t_i$

WIRELESS APPARATUS AND CHANNEL PREDICTION METHOD

CROSS REFERENCE TO RELATED APPLICATIONS

This application is a National Stage of International Application No. PCT/JP2019/009291, filed Mar. 8, 2019, claiming priority to Japanese Patent Application No. 2018-043389, filed Mar. 9, 2018, the contents of all of which are incorporated herein by reference in their entirety.

FIELD

The present invention relates to a wireless apparatus and a channel prediction method.

BACKGROUND

A wireless apparatus such as a base station or a wireless LAN (Local Area Network) access point for recent mobile phones, is often equipped with a plurality of antennas to realize high-speed communication. As one of transmission technologies that use a plurality of antennas, there is a technology referred to as beamforming, in which a directivity of a plurality of antennas as a whole is controlled by adjusting amplitudes and phases of transmission signals or reception signals of the plurality of antennas.

As beamforming, there are an analog beamforming in which amplitudes and phases of radio frequency band signals are adjusted by using amplifiers and phase shifters, and a digital beamforming in which amplitudes and phases of baseband signals are adjusted by performing multiplication by weights (i.e., weight coefficients). By using beamforming, a wireless apparatus such as a base station can realize multiuser MIMO (Multiple Input Multiple Output) transmission which spatially multiplexes signals of a plurality of terminals.

When a wireless apparatus transmits data to a wireless terminal by using digital beamforming, the wireless apparatus needs information about channels between the wireless apparatus and the wireless terminal in order to generate weights for the digital beamforming. There are roughly two types of methods for a wireless apparatus to obtain information about the channels.

In one method, a terminal transmits a reference signal, and the wireless apparatus receives the reference signal and estimates a frequency response or an impulse response of a channel.

In the other method, a wireless apparatus transmits a reference signal, and a terminal receives the reference signal and estimates a frequency response or an impulse response of a channel. In this method, the terminal transmits an estimation result or information obtained by processing the estimation result to the wireless apparatus.

In either method, if a channel state varies during a time period from when the wireless apparatus acquires channel information until when the wireless apparatus performs beamforming by using the channel information, the beamforming is not suited to the channel state, and a throughput performance is degraded.

PLT 1 discloses a method for predicting temporal variation of a channel state by using a plurality of items of information about a channel(s) acquired in the past. More specifically, in the method disclosed in PLT 1, a parameter(s) related to a prediction method such as the number of items of channel information used for prediction of a channel state and a time interval between channel information used for the prediction are determined based on a result(s) in a learning period. By performing beamforming based on a channel state predicted by the method disclosed in PLT 1, it is possible to reduce throughput performance degradation due to a temporal variation of the channel state.

PTL 2 discloses a method for predicting temporal variation of a channel state. In this method, the prediction is performed by estimating multipath angular directions forming channels and by using a conversion matrix calculated from an estimation result and channel information acquired in the past.

NPL 1 discloses a method for predicting temporal variation of an impulse response on a per tap basis by using channel impulse responses estimated in the past. In the impulse response which is a representation of a channel delay in a time domain, paths with different propagation delay times, are separated into different taps. Thus, multipath overlapping is less likely to occur at each tap, which makes it easier to predict temporal variation.

PLT 1: Japanese Patent No. 5875691
PTL 2: Japanese Patent No. 5073809

NON PATENT LITERATURE

NPL 1: I. C. Wong, et al., "Long range channel prediction for adaptive OFDM systems," in Proc. IEEE ACSSC, pp. 732-736, November 2004.

SUMMARY

In the case of OFDM (Orthogonal Frequency Division Multiplexing) or a DFT (Discrete Fourier Transform)-spread OFDM used in LTE (Long Term Evolution) or the like, in an estimated channel impulse response, a tap location corresponding to each path depends on a time difference between a processing period of FFT (Fast Fourier Transform) (binning into subcarriers) performed on a received signal and an effective OFDM symbol period or an effective DFT-spread OFDM symbol period. FIG. 7 schematically illustrates an example of a time difference between an FFT processing period (FFT period) and an effective OFDM symbol period. In FIG. 7, a direct wave 6a that arrives at a wireless apparatus from a wireless terminal, and multipath delayed waves 6b and 6c. Regarding the direct wave 6a, a start point of the FFT period is located before a start point of the effective symbol period, that is, shifted toward a guard interval (GI). When the FFT period and the effective symbol period match, a time difference ($\Delta t$) between the FFT period and the effective symbol period is 0.

That is, when a time difference between the FFT processing period and the effective OFDM symbol period differs depending on a time point of estimating an impulse response, a tap location corresponding to each path does not match among impulse responses estimated at different time points.

In the DFT-spread OFDM, a wireless terminal performs DFT processing on modulated information symbol sequence and performs inverse fast Fourier transform (IFFT) on a sequence obtained by mapping the information symbol subjected to the DFT processing only to a frequency band assigned to the wireless terminal while setting other frequency bands to zero to generate a transmission signal.

The method disclosed in NPL 1 is based on an assumption that a tap location corresponding to each path matches among impulse responses estimated at different timing (time points). Hence, when the time difference between the FFT period and the effective symbol period differs depending on a timing (time point) of estimating an impulse response, a prediction result of a channel impulse response is not reliable.

The present invention has been made in view of the above problems, and it is an object of the present invention to provide: a wireless apparatus, a channel prediction method and a program each making it possible to predict an impulse response of a channel between the wireless apparatus and a wireless terminal even when a tap location corresponding to each path differs between impulse responses at different time points.

According to a mode of the present invention, there is provided a wireless apparatus, including: a channel estimation part that acquires an estimated impulse response which is an estimate value of an impulse response of a channel between a wireless terminal and the wireless apparatus; a tap location error detection part that detects a tap location error between estimated impulse responses at different time points; and a channel prediction part that calculates a predicted impulse response which is an impulse response of the channel at a future time point, by using the estimated impulse responses and the tap location error.

According to a mode of the present invention, there is provided a channel prediction method, including:

acquiring an estimated impulse response which is an estimate value of an impulse response of a channel between a wireless terminal and the wireless apparatus;

detecting a tap location error between estimated impulse responses at different time points; and calculating a predicted impulse response which is an impulse response of the channel at a future time point, by using the estimated impulse responses and the tap location error.

According to a mode of the present invention, there is provided a program causing a processor to perform the processing of the above channel prediction method.

The present invention enables prediction of an impulse response of a channel between a wireless apparatus and a wireless terminal even when a tap location corresponding to each path differs between impulse responses at different time points. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Example embodiment of the present invention will be described in detail with reference to drawings. In the following example embodiments, it is assumed that a wireless apparatus, as means for acquiring information about a channel between the wireless apparatus and a wireless terminal, receives a reference signal from the wireless terminal and estimates a frequency response or an impulse response of the channel, but the present invention is not limited to this assumption. The present invention is also applicable to a case in which the wireless apparatus acquires information about a channel and the wireless terminal estimates a frequency response or an impulse response of the channel and transmits information about the estimation result to the wireless apparatus.

Figure 1:
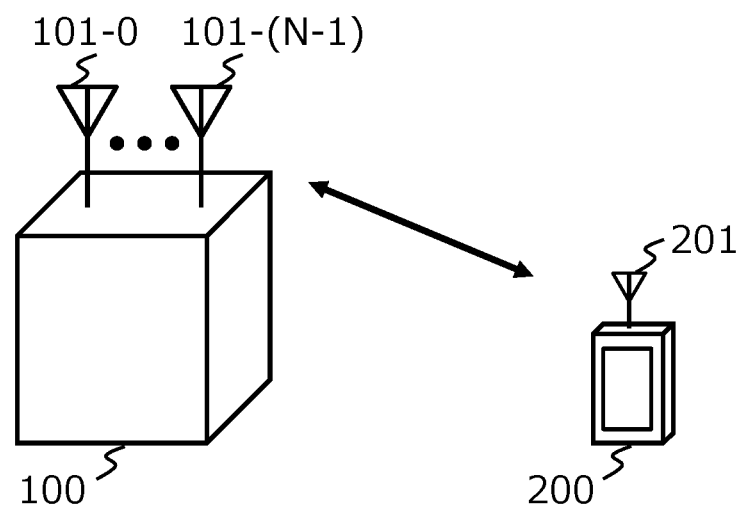
FIG. 1 is a diagram illustrating a schematic configuration of a wireless communication system according to an example embodiment of the present invention.

FIG. 1 is a diagram illustrating a schematic configuration of a wireless communication system according to an example embodiment of the present invention. The wireless communication system includes a wireless apparatus 100 and a wireless terminal 200. While only one wireless terminal 200 is illustrated in FIG. 1, the wireless communication system may include a plurality of wireless terminals 200. Alternatively, the wireless communication system may include a relay apparatus equipped with a relay function, in place of the wireless terminal 200.

The wireless apparatus 100 is a base station or an access point and includes antennas 101-0 to 101-(N−1) (where N is an integer of 2 or more, the same applies hereinafter). In the following description, unless the antennas 101-0 to 101-(N−1) need to be distinguished from one another for some particular reasons, any one of the antennas 101-0 to 101-(N−1) will simply be referred to as "an antenna 101". In addition, while the wireless apparatus 100 including a plurality of antennas 101 is illustrated in FIG. 1, the wireless apparatus 100 may include only one antenna 101. That is, the wireless apparatus 100 includes at least one antenna 101.

While the wireless terminal 200 includes only one antenna 201 in FIG. 1, the present example embodiment is not limited to this example. The wireless terminal 200 may include a plurality of antennas 201.

Figure 2:
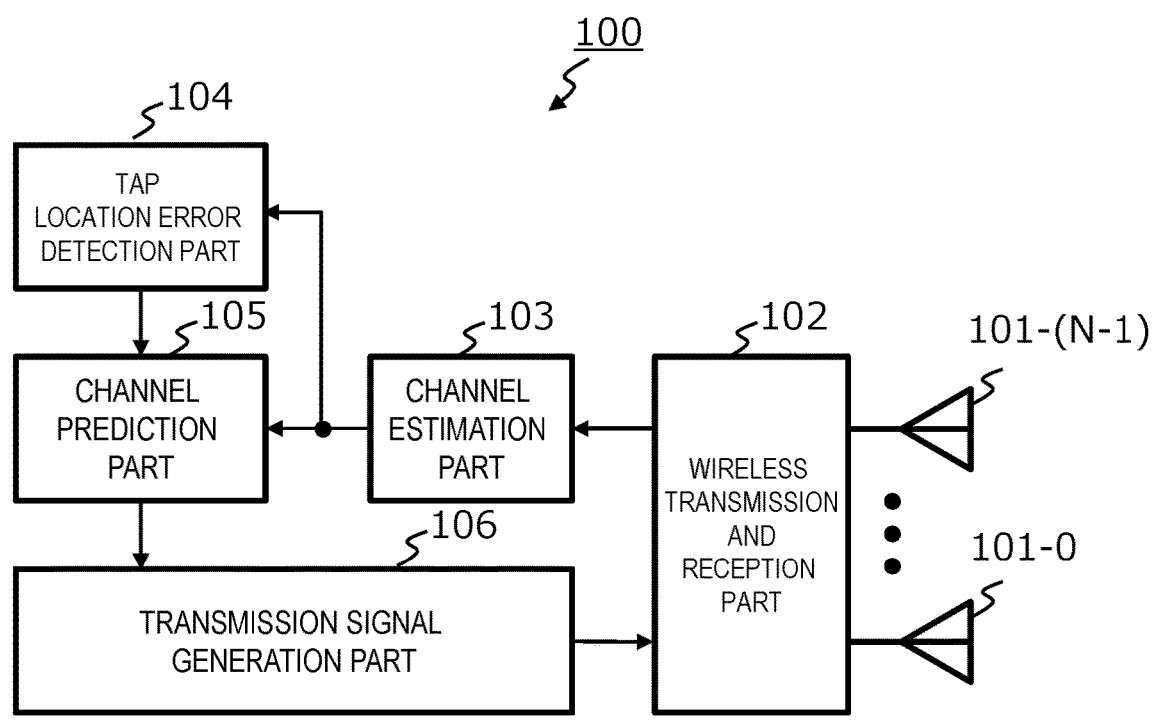
FIG. 2 is a diagram illustrating an example of a configuration of a wireless apparatus according to the example embodiment of the present invention.

FIG. 2 is a diagram illustrating a configuration of the wireless apparatus 100 according to the example embodiment of the present invention. The wireless apparatus 100 includes the antennas 101, a wireless transmission and reception part 102, a channel estimation part 103, a tap location error detection part 104, a channel prediction part 105, and a transmission signal generation part 106. In FIG. 2, an arrow between each pair of elements illustrates a part of signal (data) flow for ease of description. Each arrow does not, as a matter of course, mean that as for transmission and reception of a signal between each pair of the elements, a flow is limited only to one direction.

The antennas 101 receive a wireless signal including a reference signal transmitted from the wireless terminal 200 and outputs the received radio signal to the wireless transmission and reception part 102. The present example embodiment assumes that the reference signal transmitted by the wireless terminal 200 is known by the wireless apparatus 100.

The wireless transmission and reception part 102 converts the wireless signal inputted from the antennas 101 to a baseband signal and outputs the baseband signal to the channel estimation part 103. Depending on a wireless communication scheme, processing modules that perform processing such as CP (Cyclic Prefix) removal and FFT are needed between the wireless transmission and reception part 102 and the channel estimation part 103. However, these kinds of processing are not directly related to the present invention, illustration and description of the processing are omitted.

By using the baseband signal and the reference signal inputted from the wireless transmission and reception part 102, the channel estimation part 103 estimates an impulse response of a channel between each of the antennas 101 of the wireless apparatus 100 and the antenna 201 of the wireless terminal 200. The channel estimation part 103 outputs the estimate values of the impulse responses (estimated impulse responses) to the tap location error detection part 104 and the channel prediction part 105. Values estimated in the past may be included in the estimated impulse responses to be outputted.

The channel estimation part 103 may output impulse responses corresponding to beams by multiplying a weight matrix to estimate values of N number of impulse responses, each of which corresponds to each of the antennas 101 of the wireless apparatus 100.

By using the estimate values of the impulse responses inputted from the channel estimation part 103, the tap location error detection part 104 detects a tap location error between the estimate values of the impulse responses at different time points and outputs information about the detected error to the channel prediction part 105. The tap location error detection part 104 may store the estimate values of the impulse responses inputted from the channel estimation part 103 in a memory or the like and use the stored estimate values of the impulse responses for detection of a tap location error.

By using the estimate values of the impulse responses inputted from the channel estimation part 103 and the tap location error inputted from the tap location error detection part 104, the channel prediction part 105 predicts an impulse response at future time. The channel prediction part 105 outputs, to the transmission signal generation part 106, a predicted value of the impulse response or a predicted value of a frequency response which is obtained by applying Fourier transform (e.g., FFT processing) to the predicted value of the impulse response. The channel prediction part 105 may store the estimate values of the impulse responses inputted from the channel estimation part 103 in a memory or the like and use the stored estimate values of the impulse response for the prediction processing.

The transmission signal generation part 106 performs processing for encryption, encoding, modulation, mapping to wireless resources, etc. on transmission data inputted, for example, from a core network (not illustrated). In addition, by using the predicted impulse response or predicted frequency response inputted from the channel prediction part 105, the transmission signal generation part 106 performs precoding to the transmission data and outputs the generated signals to the wireless transmission and reception part 102. An encoding scheme, a modulation scheme, a wireless resource mapping method, etc. performed by the transmission signal generation part 106 are determined by a scheduler (not illustrated).

The predicted value of the impulse response or predicted value of the frequency response outputted by the channel prediction part 105 may be used in processing by the scheduler. Since the scheduler is not directly related to the present invention, description thereof is omitted here. Depending on the wireless communication scheme, processing modules for performing processing such as inverse fast Fourier transform (IFFT) and CP addition are needed between the transmission signal generation part 106 and the wireless transmission and reception part 102. However, these processing modules are not directly related to the present invention, illustration and description thereof will be omitted.

The wireless transmission and reception part 102 converts the baseband signal inputted from the transmission signal generation part 106 to a wireless signal (radio frequency signal) and outputs the wireless signal to the antennas 101. The antennas 101 transmit the wireless signals inputted from the wireless transmission and reception part 102.

Figure 3:
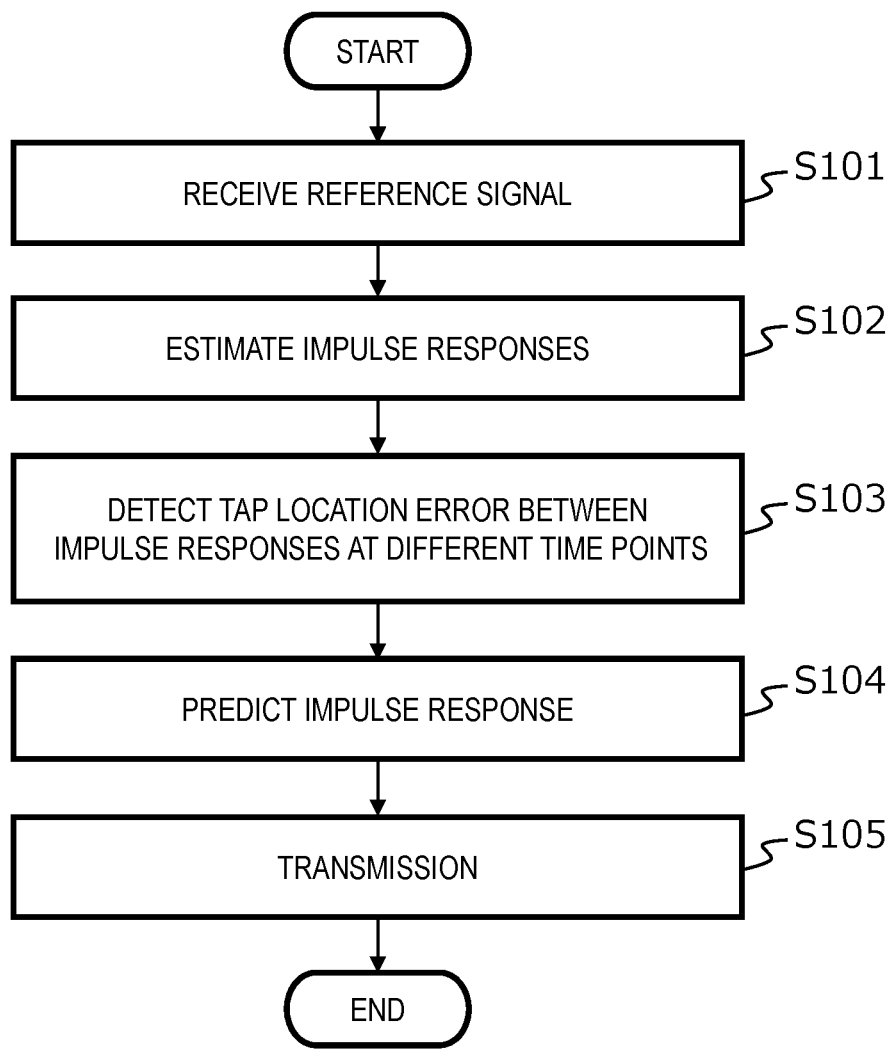
FIG. 3 is a flowchart illustrating an example of an operation of the wireless apparatus according to the example embodiment of the present invention.

The following describes an operation of the wireless apparatus 100. FIG. 3 is a flowchart illustrating an example of an operation of the wireless apparatus 100 according to the example embodiment of the present invention.

In step S101, the antennas 101 receives a wireless signal including a reference signal transmitted from the wireless terminal 200. Next, the wireless signal is inputted to the wireless transmission and reception part 102 and converted to a baseband signal.

In step S102, by using the baseband signal and the reference signal inputted by the wireless transmission and reception part 102, the channel estimation part 103 estimates an impulse response of an individual channel between the antennas 101 of the wireless apparatus 100 and the antenna 201 of the wireless terminal 200. There are several possible methods that can be used by the channel estimation part 103 to estimate the impulse response. For example, the channel estimation part 103, after estimating a frequency response, applies inverse fast Fourier transform (IFFT processing) to an estimate value of the frequency response to obtain an estimate value of an impulse response. For example, the channel estimation part 103 may use MMSE (Minimum Mean Square Error) channel estimation using a pilot signal. In this case, letting R(k) be a received pilot signal, an estimate value H^(k) of a channel frequency response H(k) when a pilot signal P(k) (k: a frequency component: a subcarrier index) is transmitted, is given, for examples, as follows.

$$H\hat{}(k)=R(k) \times X^*(k),$$

$$X(k)=P(k)/(|P(k)|^2+S),$$

where * is a complex conjugate operator. S is obtained by, for example, dividing a noise power ($\sigma^2$) by an instantaneous signal power P (P=(1/Nc)$\Sigma$<k=0, Nc-1>|H(k)|$^2$, wherein Nc is IFFT point number, that is, an OFDM symbol is generated by applying Nc-point IFFT to a pilot sequence). By applying IFFT on the estimate value H^(k) of the channel frequency response for conversion to a time domain, the channel impulse response is obtained. However, the method for estimating the impulse responses is not, as a matter of course, limited to the above methods.

In step S103, the tap location error detection part 104 detects a tap location error between the estimate values of the impulse responses at different time points. The method for detecting the tap location error will be later described.

In step S104, by using the estimate values of the impulse responses at different time points and the detected tap location error, the channel prediction part 105 predicts an impulse response at a future time point. The impulse response prediction method will be later described.

In step S105, the transmission signal generation part 106 performs processing for encryption, coding, modulation, mapping to wireless resources, precoding, etc., and the wireless transmission and reception part 102 converts the signal generated by the transmission signal generation part 106 to a wireless signal. Next, the antennas 101 transmit the wireless signal.

[Kinds of Estimated Impulse Responses]

The impulse responses estimated by the channel estimation part 103 will be described by using mathematical expressions.

Let $t_i$ denote a time point at which the i-th channel estimation is performed and let $h_n(\tau, t_i)$ denote an impulse response of a channel at a delay time $\tau$ between the antenna 101-$n$ (n is an integer of 0 or more and less than N) of the wireless apparatus 100 and the antenna 201 of the wireless terminal 200, estimated at the time point $t_i$.

Further, let D denote the impulse response tap number, let $h_{n,d}(t_i)$ denote the value of the d-th tap of the impulse response $h_n(\tau, t_i)$, and let $T_s$ denote the sampling period. Then $h_n(\tau, t_i)$ is expressed by expression (1).

$$h_n(\tau, t_i) = \sum_{d=0}^{D-1} h_{n,d}(t_i)\delta(\tau - dT_s) \quad (1)$$

In the expression (1), $\delta(\ )$ represents a Dirac delta function.

As described above, as the estimate values of the impulse responses, the channel estimation part 103 may multiply weights by the N estimate values of the impulse responses corresponding to the individual antennas 101 of the wireless apparatus 100 to calculate impulse responses corresponding to beams. By performing conversion to impulse responses corresponding to beams, paths having different angular directions are separated into different beams. Thus, in each beam, multipath overlapping becomes less likely to occur and temporal variation can be made easier to predict.

Let $g_b(\tau, t_i)$ denote an impulse response which corresponds to b-th beam (where b is an integer of 0 or more and less than B), has a delay time $\tau$, and is estimated at a time point $t_i$, and let $g_{b,d}(\tau, t_i)$ denote a value of the d-th tap of $g_b(\tau, t_i)$. Then $g_b(\tau, t_i)$ is expressed by expression (2).

$$g_b(\tau, t_i) = \sum_{d=0}^{D-1} g_{b,d}(t_i)\delta(\tau - dT_s) \quad (2)$$

Let $a_b$ denote an N-dimensional weight vector used for deriving the impulse response of the b-th beam, and let $h_d(t_i)$ denote a N-dimensional vector which has, as elements, estimate values of impulse responses corresponding to the antennas 101-0 to 101-(N−1) at the d-th tap. Then $g_{b,d}(t_i)$ and $h_d(t_i)$ are expressed by expressions (3) and (4), respectively.

$$g_{b,d}(t_i) = a_b^H h_d(t_i) \quad (3)$$

$$h_d^T(t_i) = [h_{0,d}(t_i), h_{1,d}(t_i), \ldots, h_{N-1,d}(t_i)] \quad (4)$$

where, the superscript H denotes a Hermitian transpose, and the superscript T denotes a transpose.

As the N-dimensional weight vector, for example, an individual column or row vector in a DFT (Discrete Fourier Transform) matrix are used.

An element d(k,1) (k,1=0, ..., N−1) in an n-dimensional DFT matrix D is given, for examples, as follows.

$$d(k, l) = \frac{1}{\sqrt{n}} \exp\left(j\frac{2\pi kl}{n}\right)$$

where $j^2 = -1$. When the DFT matrix is used, the beam number B is equal to the above N. The weight vector $a_b$ of the b-th beam when the DFT matrix is used is expressed by expression (5).

$$a_b^T = \frac{1}{\sqrt{N}}\left[\exp\left\{j2\pi\frac{b}{N}\cdot 0\right\}, \exp\left\{j2\pi\frac{b}{N}\cdot 1\right\}, \ldots, \exp\left\{j2\pi\frac{b}{N}\cdot(N-1)\right\}\right] \quad (5)$$

When the antennas 101 has a planar array arrangement in vertical and horizontal directions, a Kronecker product of a DFT matrix corresponding to an individual direction may be used as a weight. For example, the antennas 101 has a planar array arrangement (N=$N_x \times N_z$) in which $N_x$ antennas 101 are arranged in the horizontal direction and $N_z$ antennas 101 are arranged in the vertical direction, the N-dimensional weight vector $a_b$ of the b-th beam is expressed by the following expression.

$$a_b^T = [a_b(0,0), \ldots, a_b(0, N_z-1), a_b(1,0), \ldots, a_b(N_x-1, N_z-1)]$$

$$a_b(n_x, n_z) = \frac{1}{\sqrt{N_x N_z}} \exp\left\{j\frac{2\pi}{N_x N_z}[n_x N_z i_x(b) + n_z N_x i_z(b)]\right\}$$

$$(0 \leq n_x \leq N_x, 0 \leq n_z \leq N_z)$$

where $i_x(b)$ is a horizontal direction beam number of the b-th beam which is 0 or more and less than $N_x$ and $i_z(b)$ is a vertical direction beam number of the b-th beam which is 0 or more and less than $N_z$. Among B beams, the combinations of $i_x(b)$ and $i_z(b)$ are set so as not to overlap.

When the antennas 101 are configured as antennas of two polarizations orthogonal to each other, impulse responses corresponding to beams can be calculated per polarization. In a case where the antennas 101 have a planar array arrangement of two polarizations (N=$N_x \times N_z \times 2$), assuming that elements of the N-dimensional weight vector $a_b$ are arranged in the order of $N_x \times N_z$ weights of a first polarization and $N_x \times N_z$ weights of a second polarization, when the b-th beam corresponds to the first polarization, the N-dimensional weight vector $a_b$ of the b-th beam is expressed by the following expression.

$$a_b^T = [a_b(0,0), \ldots, a_b(0,N_z-1), a_b(1,0), \ldots, a_b(N_x-1, N_z-1), 0, \ldots, 0]$$

When the b-th beam corresponds to the second polarization, the N-dimensional weight vector $a_b$ of the b-th beam is expressed by the following expression.

$$a_b^T=[0, \ldots, 0, a_b(0,0), \ldots, a_b(0,N_z-1), a_b(1,0), \ldots, a_b(N_z-1,N_z-1)]$$

[Tap Location Error Detection Method]

The following describes the method for detecting a tap location error between estimated impulse responses at different time points. The method is performed by the tap location error detection part 104.

The following description will be made on a case in which an estimate value of the impulse response used by the tap location error detection part 104 is an estimate value of the impulse response corresponding to each of the antennas 101. However, the similar processing is applicable to a case of an estimate value of an impulse response corresponding to a beam.

First Example

Figure 4:
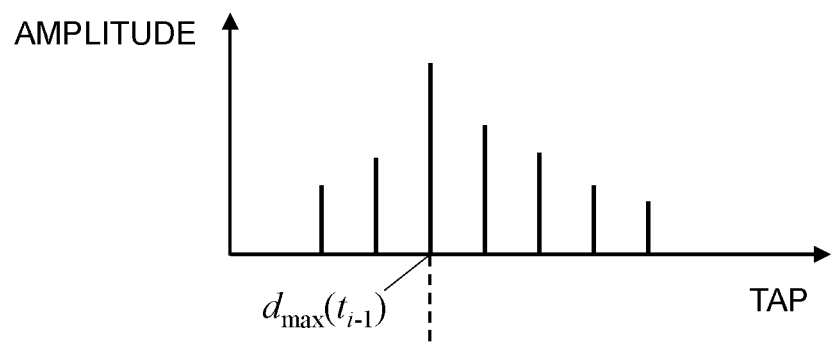
FIG. 4 is a diagram illustrating a first example of a tap location error detection method according to the example embodiment of the present invention.
Figure 4:
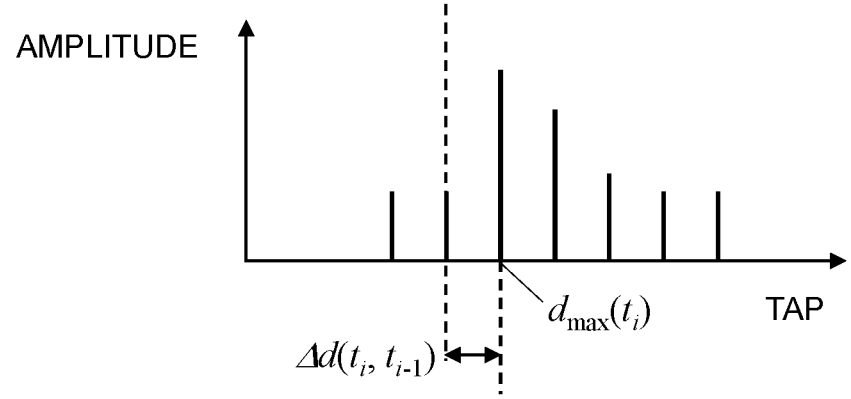

A first example of the tap location error detection method will be described with reference to FIG. 4. In the example in FIG. 4, between impulse responses 4a and 4b estimated at different time points ti−1 and ti, tap locations corresponding to each path do not match. In the first example, the tap location error is detected based on a tap location at which the magnitude of the impulse response assumes the largest value.

Let $d_{max}(t_i)$ denote a tap corresponding to the largest magnitude (amplitude value) of the estimate value of the impulse response (estimated impulse response) 4b at the time point $t_i$. Then $d_{max}(t_i)$ is expressed, for example, by expression (6).

$$d_{max}(t_i) = \mathrm{argmax}_d \Sigma_{n=0}^{N-1} |h_{n,d}(t_i)|^2 \qquad (6)$$

In the expression (6), argmax indicates an argument that gives a maximum value or argument of the maximum. In the expression (6), d which gives the largest value of the sum of squares of magnitudes (absolute values) of the impulse responses $h_{n,d}(t_i)$ from n=0 to N−1 is set to dmax($t_i$). On the right side of the expression (6), the sum of squares of magnitudes (absolute values) of the impulse responses $h_{n,d}(t_i)$ from n=0 to (N−1) is calculated. However, the number of impulse responses used for the calculation of the square sum may be less than N. A tap $d_{max}(t_{i-1})$ corresponding to the largest magnitude (amplitude value) of the estimate value of the impulse response (estimated impulse response) 4a at the previous time point $t_{i-1}$ is calculated in the same way.

Let $\Delta d(t_i, t_{i-1})$ denote a tap location error between the estimate value of the impulse response at the time point $t_i$ and the estimate value of the impulse response at $t_{i-1}$ (time point immediately before the time point $t_i$). Then $\Delta d(t_i, t_{i-1})$ is expressed by expression (7), using the tap location corresponding to the largest magnitudes of the impulse responses at the respective time points.

$$\Delta d(t_i, t_{i-1}) = d_{max}(t_i) - d_{max}(t_{i-1}) \qquad (7)$$

Second Example

Figure 5:
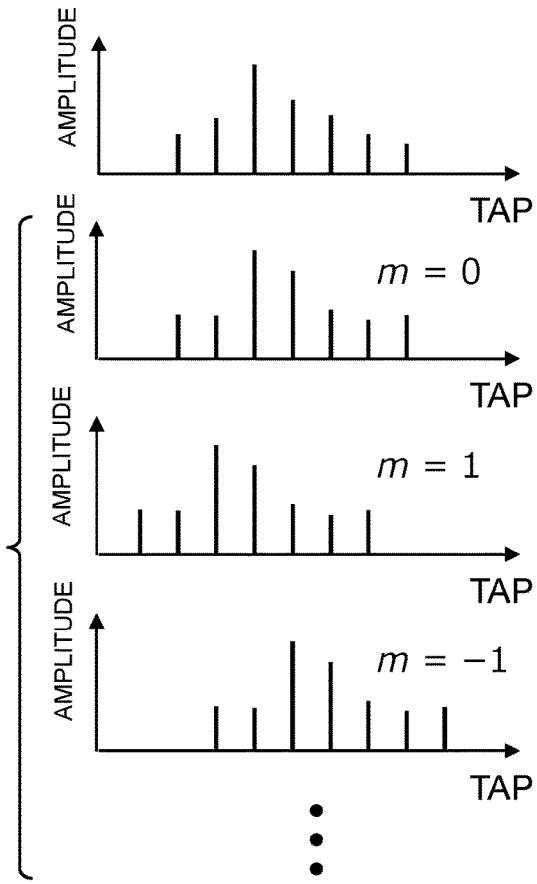
FIG. 5 is a diagram illustrating a second example of the tap location error detection method according to the example embodiment of the present invention.
Figure 5:
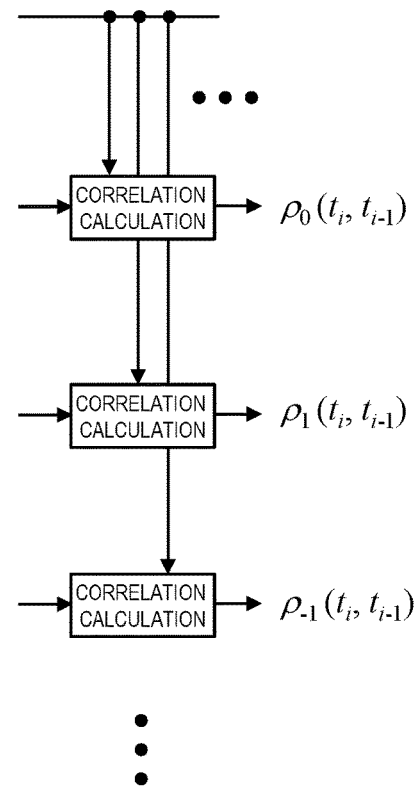

A second example of the tap location error detection method will be described with reference to FIG. 5. In the second example, the tap location error detection part 104 calculates a correlation between impulse responses at different time points while shifting a tap location of the impulse response at one time point, and detects a tap location error, based on a correlation value with regards to the impulse response at the other time point. In the second example, the tap location error detection part 104 takes into account not only taps corresponding to the largest magnitudes of the impulse responses but also a plurality of taps, the tap location error detection part 104 can detect the tap location error more accurately than the first example.

Let $\rho_m(t_i, t_{i-1})$ denote a correlation between an estimate value of the impulse response (estimated impulse response) 5a at a time point $t_{i-1}$ and a result obtained by performing cyclic shift on the tap location of the estimate value of the impulse response (estimated impulse response) 5b at a time point $t_i$ by m (m is an integer) (left shift by m taps when m is an positive integer, right shift by |m| taps (|m| is an absolute value of m) when m is a negative integer, and no shift when m is 0). Then $\rho_m(t_i, t_{i-1})$ is expressed by expression (8).

$$\rho_m(t_i, t_{i-1}) = \sum_{n=0}^{N-1}\sum_{d=0}^{D-1} |h_{n,mod(d+m,D)}(t_i)|^2 \cdot |h_{n,d}(t_{i-1})|^2 \qquad (8)$$

In the expression (8), $h_{n,d}(t_{i-1})$ denotes an estimate value of a d-th tap of an impulse response of the antenna 101-n at the time point $t_{i-1}$, and $h_{n,mod(d+m,D)}(t_i)$ denotes an estimate value of a tap location mod(d+m,D) of an impulse response of the antenna 101-n at the time point $t_i$, where mod(x,y) is a function of outputting a remainder of division of an integer x by an integer y, and the output is a value of 0 or more (a non-negative integer). That is, $h_{n,mod(d+m,D)}(t_i)$ is an estimate value of the impulse response obtained by performing cyclic shift on the location of the d-th tap of the estimated impulse response at the time point $t_i$ by m (m is an integer). In the estimated impulse responses 5b in FIG. 5, estimated impulse responses of the antenna 101-n at the time point $t_i$ for m=0, 1, and −1 are illustrated. In FIG. 5, m=1 represents an impulse response obtained by applying left cyclic shift by one tap to the estimated impulse response for m=0, and m=−1 represents an impulse response obtained by applying right cyclic shift by one tap to the estimated impulse response for m=0.

In the calculation of the correlation in the expression (8), the sum is calculated for n=0 to (N−1) and for d=0 to (D−1) on the right side. However, the calculation numbers of the sum may be reduced to those less than N and D, respectively. For example, only taps, at which a magnitude of the impulse response is equal to or more than a threshold value, may be used as calculation targets of the correlation. FIG. 5 illustrates correlation calculations for m=0, 1, −1, . . . , etc. An appropriate range of m, for which the correlation is calculated, may be selected in view of an operation amount, etc.

In the second example, the tap location error $\Delta d(t_i, t_{i-1})$ to be detected is expressed by expression (9), by using the correlations calculated by the expression (8).

$$\Delta d(t_i, t_{i-1}) = \mathrm{argmax}_m |\rho_m(t_i, t_{i-1})| \qquad (9)$$

That is, in the second example, as a result of the correlation calculation for m=0, 1, −1, . . . , etc., m corresponding to the largest correlation $\rho_m(t_i, t_{i-1})$ is set to $\Delta d(t_i, t_{i-1})$ (the tap location error between the estimate value of the impulse response at the time point $t_i$ and the estimate value of the impulse response at the time point $t_{i-1}$ (time point immediately before the time point $t_i$)).

[Impulse Response Prediction Method]

The following describes method for predicting an impulse response at a future time point. This method is performed by the channel prediction part 105. While the following description assumes an example in which the channel prediction part 105 uses estimate values of the impulse responses corresponding to the individual antennas 101, the same processing is also applicable to a case in which the channel prediction part 105 uses estimate value of the impulse responses corresponding to beams. By multiplying predicted values of the impulse responses corresponding to beams by weight matrixes, the channel prediction part 105 can calculate the predicted value of the impulse responses corresponding to the individual antennas 101 of the wireless apparatus 100.

In a first example of the impulse response prediction method, linear extrapolation is performed on the estimate values of the impulse responses at most recent two time points, to predict an impulse response at a future time point.

Let $t_{i-1}$ and $t_i$ denote the most recent two time points at which channel estimation has been performed. Let $h'_{n,d}(t)$ denote a predicted value of the impulse response of the antenna 101-$n$ at d-th tap at a time point t (t>$t_i$). Then $h'_{n,d}(t)$ is calculated by expressions (10) and (11).

$$h'_{n,d}(t) = h_{n,l}(t_i) + \frac{t - t_i}{t_i - t_{i-1}} \cdot (h_{n,l}(t_i) - h_{n,d}(t_{i-1})) \tag{10}$$

$$l = \mathrm{mod}(d + \Delta d(t_i, t_{i-1}), D) \tag{11}$$

In the expression (10), $h_{n,1}(t_i)$ denotes an impulse response estimate value at the 1-th tap of the estimated impulse response of the antenna 101-$n$ at the time point $t_i$. This $h_{n,1}(t_i)$ is the estimate value of the impulse response obtained by performing cyclic shift on the location of the d-th tap of the estimated impulse response at the time point $t_i$ by the tap location error $\Delta d(t_{i-1}, t_i)$, from the expression (11) (left shift by $\Delta d(t_{i-1}, t_i)$, right shift by $|\Delta d(t_{i-1}, t_i)|$, or no shift is performed, based on whether a value of $\Delta d(t_{i-1}, t_i)$ is positive, negative or 0). In the expressions (10) and (11), the channel prediction part 105 performs the prediction processing by shifting the estimate value of the impulse response at the time point $t_i$ by the tap location error $\Delta d(t_{i-1}, t_i)$, using the estimate value of the impulse response at the time point $t_{i-1}$, as a reference. But, the channel prediction part 105 may well perform the prediction processing by using the estimate value of the impulse response at the time point $t_i$ as the reference.

While, in the above first example, the linear-extrapolation-based prediction is performed by using the estimate values of the impulse responses at the most recent two time points, a prediction based on extrapolation of two orders or more may be performed by using impulse responses at three or more time points.

In a second example of the impulse response prediction method, the channel prediction part 105 individually performs linear extrapolation on the amplitudes and the phases of the estimated values of the impulse responses at the most recent two time points, to predict an impulse response at a future time point.

In a situation in which there is no overlapping of multipaths, while an amplitude of an impulse response hardly fluctuates, a phase thereof varies in proportion to a Doppler frequency.

In such a situation where variation degrees of an amplitude and a phase are different to each other, better prediction accuracy is obtained by predicting individually the amplitude and the phase as in the second example.

Let $t_{i-1}$ and $t_i$ denote most recent two time points at which the channel estimation has been performed. Then an amplitude $|h'_{n,d}(t)|$ which is a predicted value at the d-th tap of an impulse response of the antenna 101-$n$ at a time point t (t>$t_i$) is calculated by expressions (12) and (11).

$$|h'_{n,d}(t)| = |h_{n,l}(t_i)| + \frac{t - t_i}{t_i - t_{i-1}} \cdot (|h_{n,l}(t_i)| - |h_{n,d}(t_{i-1})|) \tag{12}$$

A phase $\arg(h'_{n,d}(t))$ which is a predicted value at the d-th tap of the impulse response of the antenna 101-$n$ at the time point t (t>$t_i$) is calculated by expressions (13) and (11).

$$\arg[h'_{n,d}(t)] = \arg[h_{n,l}(t_i)] + \frac{t - t_i}{t_i - t_{i-1}} \cdot (\arg[h_{n,l}(t_i)] - \arg[h_{n,d}(t_{i-1})]) \tag{13}$$

It is noted that in the expressions (12) and (13), the channel prediction part 105 performs prediction processing by using the estimate value of the impulse response at the time point $t_{i-1}$ as a reference, and shifting the estimate value of the impulse response at the time point $t_i$ by the tap location error, but the channel prediction part 105 may perform the prediction processing by using an estimate value of the impulse response at the time point $t_i$ as a reference.

In the above second example, a prediction is performed based on a linear-extrapolation by using estimate values of impulse responses at most recent two time points, but a prediction based on a quadratic or higher order extrapolation may be performed by using impulse responses at three or more time points.

In a third example of the impulse response prediction method, the channel prediction part 105 performs weighted synthesis of estimate values of the impulse responses at a plurality of time points, to predict an impulse response.

By setting weight coefficients in view of, for example, statistical characteristics of an impulse response, good prediction accuracy can be obtained. Let P denote the number of estimate values of impulse responses to be synthesized and $w_p$ (p=0 to (P−1)) a weight coefficient. Then $h'_{n,d}(t)$, which is a predicted value at the d-th tap of the impulse response of the antenna 101-$n$ at the time point t (t>$t_i$), is calculated by expressions (14) and (15).

$$h'_{n,d}(t) = \sum_{p=0}^{P-1} w_p h_{n,l_p}(t_{i-p}) \tag{14}$$

$$l_p = \mathrm{mod}(d + \Delta d(t_{i-p}, t_{i-P+1}), D) \tag{15}$$

In the expression (14), $h_{n,1_p}(t_{i-p})$ denotes an estimate value at the $l_p$th tap of the impulse response of the antenna 101-$n$ at a time point $t_{i-p}$. From the expression (15), $h_{n,1_p}(t_{i-p})$ is an estimate value of the impulse response obtained by performing cyclic shift on a location of the d-th tap of the estimated impulse response at the time point $t_{i-p}$ by a tap location error $\Delta d(t_{i-p}, t_{i-P+1})$ between the estimated impulse response as a reference (time $t_{i-P+1}$) and the estimated impulse response at the time point $t_{i-p}$ (left shift by $\Delta d(t_{i-p}, t_{i-P+1})$, right shift by $|\Delta d(t_{i-p}, t_{i-P+1})|$, or no shift is performed, based on whether $\Delta d(t_{i-p}, t_{i-P+1})$ is positive, negative, or 0). In the expressions (14) and (15), the channel prediction part 105 performs the prediction processing by shifting the estimate value of the impulse response at the individual time point $t_{i-p}$ by the tap location error $\Delta d(t_{i-p}, t_{i-P+1})$ from the estimate value of the impulse response at the time point $t_{i-P+1}$, as the reference. However, the channel prediction part 105 may perform the prediction processing by using an estimate value of the impulse response at a different time point as the reference.

The weight coefficients in the expression (14) may be calculated based on, for example, auto regressive (AR) model, MMSE (Minimum Mean Squared Error) criterion, RLS (Recursive Least Squares) criterion, Kalman filter, or the like.

In the expression (14), as in the first example of the prediction method, while the channel prediction part 105 performs the processing on the estimate values of the impulse responses, the channel prediction part 105 may perform the same prediction processing individually on the amplitudes and phases of the estimate value of the impulse responses, as in the second example.

When an estimate value of the impulse response represents a magnitude that is less than a threshold value, the impulse response prediction processing may not be performed on the corresponding tap.

In this case, the channel prediction part 105 may set 0 as the predicted impulse response. In this way, the operation amount can be reduced, and by setting an appropriate threshold value, deterioration of the prediction accuracy due to noise or the like can be reduced. In addition, if a predicted impulse response represents a magnitude that is less than a threshold value, the channel prediction part 105 may set 0 as the predicted value for the corresponding tap. By setting an appropriate threshold value, degradation of the prediction accuracy due to noise or the like can be reduced. In addition, as needed, the tap location of the predicted impulse response may be shifted.

As described above, according to the example embodiment of the present invention, regarding a channel(s) between the wireless apparatus 100 and the wireless terminal 200, the wireless apparatus 100 is configured to detect the tap location error between impulse responses at different time points and hence the wireless apparatus 100 can predict an impulse response of the channel(s), even when a tap location corresponding to each path differs between impulse responses at different time points.

Figure 6:
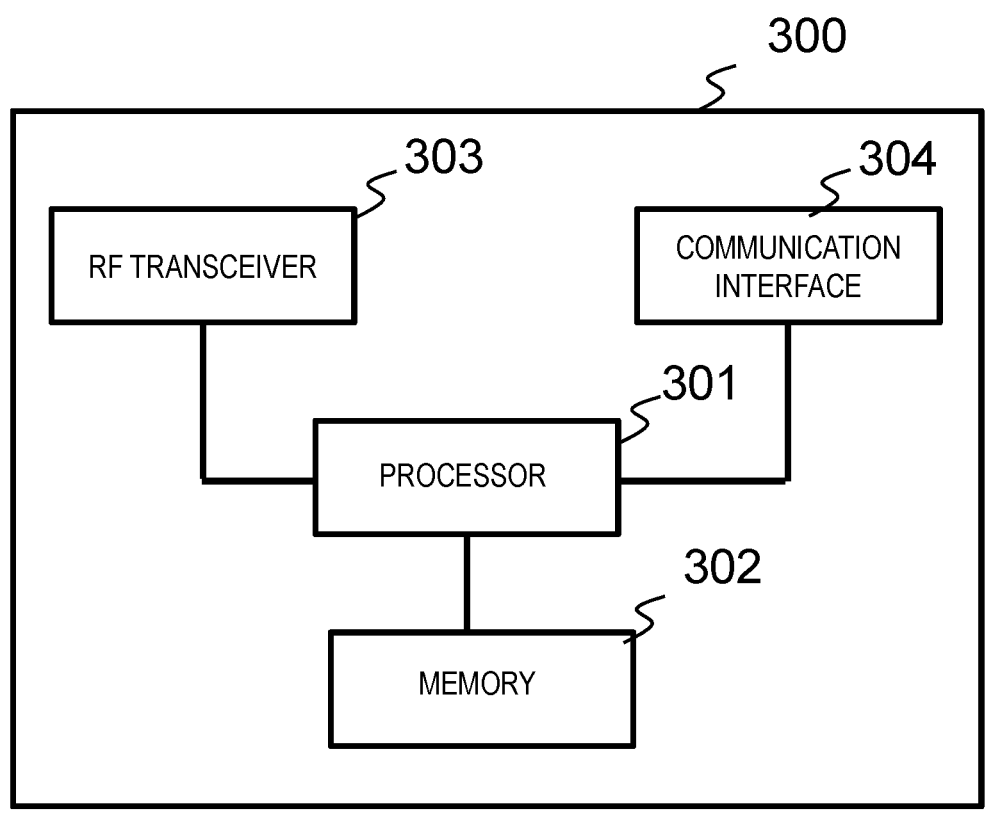
FIG. 6 is a diagram illustrating a configuration example according to the example embodiment of the present invention.
Figure 7:
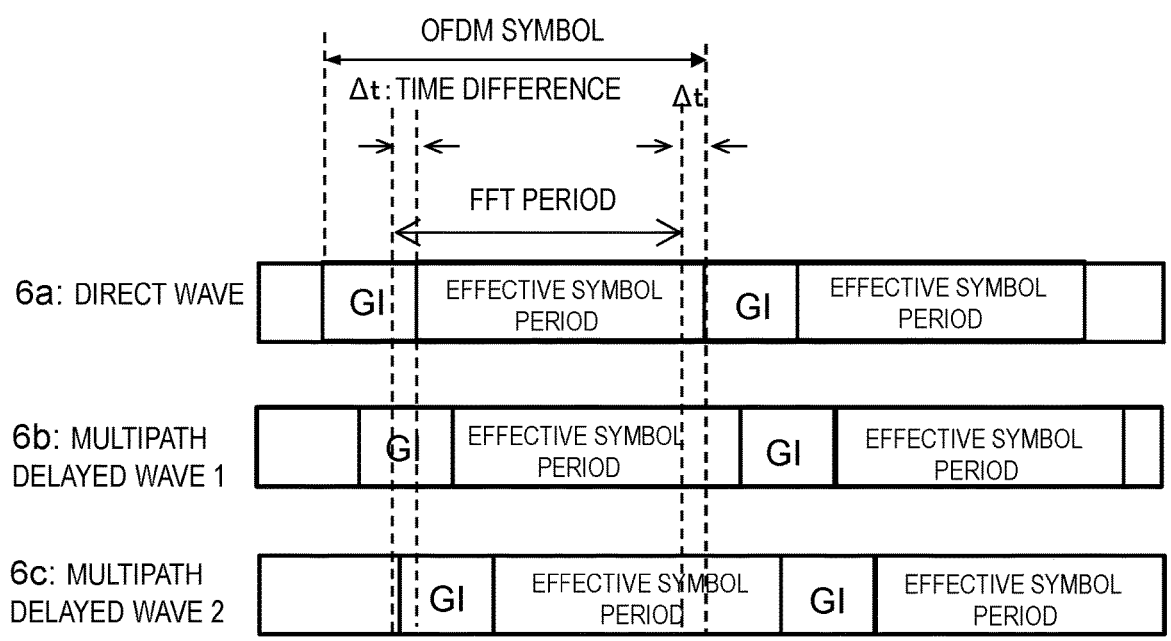
FIG. 7 is a diagram illustrating FFT period and effective symbol periods of OFDM signals.

As schematically illustrated in for example FIG. 6, at least a part of the processing performed by the channel estimation part 103, the tap location error detection part 104, the channel prediction part 105, and the transmission signal generation part 106 of the wireless apparatus 100 according to the example embodiment described with reference to FIG. 2 may be performed by a processor 301 connected to a memory 302 in a processor apparatus (a computer apparatus) 300. The processor 301 may be a communication processor such as a baseband processor or a signal processing processor such as DSP (Digital Signal Processor). The memory 302 may hold a program (instructions) that causes the processor 301 to perform at least a part or all of the processing of the channel estimation part 103, the tap location error detection part 104, the channel prediction part 105, and the transmission signal generation part 106. Examples of the memory 302 may include a semiconductor memory (for example, RAM (Random Access Memory), ROM (Read Only Memory), EEPROM (Electrically Erasable And Programmable ROM), or the like), HDD (Hard Disk Drive), CD (Compact Disc), and DVD (Digital Versatile Disc). An RF (Radio Frequency) transceiver 303 in the processor apparatus 300 corresponds to the wireless transmission and reception part 102 in FIG. 2. A communication interface 304 is, for example, an interface (Network Interface Card: NIC) that communicates with a core network.

The disclosure of each of the above PTLs 1 and 2 and NPL 1 is incorporated herein by reference thereto. Variations and adjustments of the example embodiment and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. Namely, the present invention of course includes various variations and modifications that could be made by those skilled in the art according to the overall disclosure including the claims and the technical concept.

The example embodiment can be described, but not limited to, as the following notes (supplementary notes).

(Note 1)

A wireless apparatus, including:

a channel estimation part that acquires an estimated impulse response, which is an estimate value of an impulse response of a channel between a wireless terminal and the wireless apparatus;

a tap location error detection part that detects a tap location error between estimated impulse responses at different time points; and a channel prediction part that calculates a predicted impulse response, which is an impulse response of the channel at a future time point, by using the estimated impulse responses and the tap location error.

(Note 2)

The wireless apparatus according to note 1, further including a plurality of antennas, wherein the channel estimation part estimates, as the impulse response, an impulse response of a channel between the wireless terminal and an individual one of the plurality of antennas.

(Note 3)

The wireless apparatus according to note 1, further including a plurality of antennas, wherein the channel estimation part calculates the impulse response by using a plurality of impulse responses of a plurality of channels between the wireless terminal and individual ones of the plurality of antennas and a weight matrix.

(Note 4)

The wireless apparatus according to any one of notes 1 to 3, wherein the tap location error detection part detects the tap location error based on a tap location at which a magnitude of the estimated impulse response assumes the largest value.

(Note 5)

The wireless apparatus according to any one of notes 1 to 3, wherein the tap location error detection part detects the tap location error based on a correlation between the estimated impulse responses at different time points.

(Note 6)

The wireless apparatus according to any one of notes 1 to 5, wherein the channel prediction part adjusts the tap locations of the estimated impulse responses based on the tap location error and calculates the predicted impulse response.

(Note 7)

The wireless apparatus according to any one of notes 1 to 6, wherein the channel prediction part predicts an amplitude and a phase of the predicted impulse response individually.

(Note 8)

The wireless apparatus according to any one of notes 1 to 7, wherein the channel prediction part sets 0 as a value of the predicted impulse response for a tap(s) at which a magnitude of the estimated impulse response is less than a predetermined threshold value, without calculating a predicted impulse response for the tap (s).

(Note 9)

The wireless apparatus according to any one of notes 1 to 7, wherein the channel prediction part sets 0 as a value of the predicted impulse response for a tap (s) at which a magnitude of the predicted impulse response is less than a predetermined threshold value.

(Note 10)

A channel prediction method for predicting a channel between a wireless terminal and a wireless apparatus, the method including:

acquiring an estimated impulse response, which is an estimate value of an impulse response of a channel between the wireless terminal and the wireless apparatus;

detecting a tap location error between estimated impulse responses at different time points; and calculating a predicted impulse response, which is an impulse response of the channel at a future time point, by using the estimated impulse responses and the tap location error.

(Note 11)

The channel prediction method according to note 10, including estimating, as the impulse response, an impulse response of a channel between the wireless terminal and an individual one of a plurality of antennas of the wireless apparatus.

(Note 12)

The channel prediction method according to note 10, including calculating the impulse response by using a plurality of impulse responses of a plurality of channels between the wireless terminal and individual ones of the plurality of antennas and a weight matrix.

(Note 13)

The channel prediction method according to any one of notes 10 to 12, including detecting the tap location error based on a tap location at which a magnitude of the estimated impulse response assumes the largest value.

(Note 14)

The channel prediction method according to any one of notes 10 to 12, including detecting the tap location error based on a correlation between the estimated impulse responses at different time points.

(Note 15)

The channel prediction method according to any one of notes 10 to 14, including adjusting the tap locations of the estimated impulse responses based on the tap location error and calculating the predicted impulse response.

(Note 16)

The channel prediction method according to any one of notes 10 to 15, including predicting an amplitude and a phase of the predicted impulse response individually.

(Note 17)

The channel prediction method according to any one of notes 10 to 16, including, setting 0 as a value of the predicted impulse response for a tap(s) at which a magnitude of the estimated impulse response is less than a predetermined threshold value, without calculating a predicted impulse response for the tap (s).

(Note 18)

The channel prediction method according to any one of notes 10 to 17, including setting 0 as a value of the predicted impulse response for a tap (s) at which a magnitude of the predicted impulse response is less than a predetermined threshold value.

(Note 19)

A program causing a computer included in a wireless apparatus to perform processing comprising:

acquiring an estimated impulse response, which is an estimate value of an impulse response of a channel between a wireless terminal and the wireless apparatus;

detecting a tap location error between estimated impulse responses acquired at different time points out; and calculating a predicted impulse response, which is an impulse response of the channel at a future time point, by using the estimated impulse responses and the tap location error.

(Note 20)

The program according to note 19, causing the computer to perform processing for estimating, as the impulse response, an impulse responses of a channel between the wireless terminal and an individual one of a plurality of antennas of the wireless apparatus.

(Note 21)

The program according to note 19, causing the computer to perform processing for calculating the impulse response by using a plurality of impulse responses of a plurality of channels between the wireless terminal and individual ones of the plurality of antennas and a weight matrix.

(Note 22)

The program according to any one of notes 19 to 21, causing the computer to perform processing for detecting the tap location error based on a tap location at which a magnitude of the estimated impulse response assumes the largest value.

(Note 23)

The program according to any one of notes 19 to 22, causing the computer to perform processing for detecting the tap location error based on a correlation between the estimated impulse responses at different time points.

(Note 24)

The program according to any one of notes 19 to 23, causing the computer to perform processing for adjusting the tap locations of the estimated impulse responses based on the tap location error and calculating a predicted impulse response.

(Note 25)

The program according to any one of notes 19 to 24, causing the computer to perform processing for predicting an amplitude and a phase of the predicted impulse response individually.

(Note 26)

The program according to any one of notes 19 to 25, causing the computer to perform processing for setting 0 as a value of the predicted impulse response for a tap(s) at which a magnitude of the estimated impulse response is less than a predetermined threshold value, without calculating a predicted impulse response for the tap (s).

(Note 27)

The program according to any one of notes 19 to 26, causing the computer to perform processing for setting 0 as a value of the predicted impulse response for a tap (s) at which a magnitude of the predicted impulse response is less than a predetermined threshold value.

(Note 28)

A non-transitory computer-readable recording medium holding the program according to any one of notes 19 to 27.

What is claimed is:

1. A wireless apparatus, comprising:
   a channel estimation part that acquires an estimated impulse response which is an estimate value of an impulse response of a channel between a wireless terminal and the wireless apparatus;
   a tap location error detection part that detects a tap location error between estimated impulse responses acquired at different time points; and
   a channel prediction part that calculates a predicted impulse response which is an impulse response of the channel at a future time point by using the estimated impulse responses and the tap location error.

2. The wireless apparatus according to claim 1, further comprising
   a plurality of antennas,
   wherein the channel estimation part estimates, as the impulse response, an impulse response of a channel between the wireless terminal and an individual one of the plurality of antennas.

3. The wireless apparatus according to claim 1, further comprising
   a plurality of antennas,
   wherein the channel estimation part calculates, as the impulse response, an impulse response corresponding to a beam by using a plurality of impulse responses of a plurality of channels between the wireless terminal and individual ones of the plurality of antennas and a weight matrix.

4. The wireless apparatus according to claim 1, wherein the tap location error detection part detects the tap location error based on a magnitude of the estimated impulse response at each tap.

5. The wireless apparatus according to claim 1, wherein the tap location error detection part detects the tap location error based on a correlation between the estimated impulse responses at different time points.

6. The wireless apparatus according to claim 1, wherein the channel prediction part adjusts a tap location of the estimated impulse response based on the tap location error and calculates the predicted impulse response.

7. The wireless apparatus according to claim 1, wherein the channel prediction part predicts an amplitude and a phase of the predicted impulse response.

8. The wireless apparatus according to claim 1, wherein the channel prediction part sets 0 as a value of the predicted impulse response for a tap at which a magnitude of the estimated impulse response is less than a predetermined threshold value, without calculating a predicted impulse response for the tap.

9. The wireless apparatus according to claim 1, wherein the channel prediction part sets 0 as a value of the predicted impulse response for a tap at which a magnitude of the predicated impulse response is less than a predetermined threshold value.

10. The wireless apparatus according to claim 1, wherein the channel prediction part performs cyclic shift on locations of taps of the estimated impulse response at a first time point by the tap location error between the estimated impulse response at the first time point and the estimated impulse response at a second time point, and
    obtains a value at a tap of the predicted impulse response, by performing linear or not less than quadratic extrapolation on at least a value at the tap of the estimated impulse response at the second time point and a value at a corresponding tap of the estimated impulse response cyclic shifted.

11. The wireless apparatus according to claim 1, wherein the channel prediction part performs weighted synthesis of a plurality of estimated impulse responses at a plurality of time points to obtain the predicted impulse response at the future time point, each of the plurality of estimated impulse responses obtained by performing cyclic shift on locations of taps of the estimated impulse response at each time point by the tap location error between the estimated impulse response at the each time point and the estimated impulse response at a reference time point.

12. A channel prediction method, comprising:
    acquiring an estimated impulse response which is an estimate value of an impulse response of a channel between a wireless terminal and a wireless apparatus;
    detecting a tap location error between estimated impulse responses acquired at different time points; and
    calculating a predicted impulse response which is an impulse response of the channel at a future time point by using the estimated impulse responses and the tap location error.

13. The channel prediction method according to claim 12, comprising
    estimating, as the impulse response, an impulse response of a channel between the wireless terminal and an individual one of a plurality of antennas included in the wireless apparatus.

14. The channel prediction method according to claim 12, comprising
    calculating, as the impulse response, an impulse response corresponding to a beam by using a plurality of impulse responses of a plurality of channels between the wireless terminal and individual ones of the plurality of antennas and a weight matrix.

15. The channel prediction method according to claim 12, comprising
    detecting the tap location error based on a magnitude of the estimated impulse response at each tap.

16. The channel prediction method according to claim 12, comprising
    detecting the tap location error based on a correlation between the estimated impulse responses at different time points.

17. The channel prediction method according to claim 12, comprising
    adjusting a tap location of the estimated impulse response based on the tap location error to calculate a predicted impulse response.

18. The channel prediction method according to claim 12, comprising
    predicting an amplitude and a phase of the predicted impulse response.

19. The channel prediction method according to claim 12, comprising
    setting 0 as a value of the predicted impulse response for a tap at which a magnitude of the estimated impulse response is less than a predetermined threshold value without calculating a predicted impulse response for the tap.

20. A non-transitory computer readable medium storing a program causing a processor included in a wireless apparatus to execute processing comprising:
    acquiring an estimated impulse response which is an estimate value of an impulse response of a channel between a wireless terminal and the wireless apparatus;

detecting a tap location error between estimated impulse responses acquired at different time points; and
a predicted impulse response which is an impulse response of the channel at a future time point by using the estimated impulse responses and the tap location error.

* * * * *